US008307027B2

(12) United States Patent
Stuhec et al.

(10) Patent No.: US 8,307,027 B2

(45) Date of Patent: Nov. 6, 2012

(54) CREATING OR INTERPRETING AN ELECTRONIC COMMUNICATION

(75) Inventors: Gunther Stuhec, Heidelberg (DE); Markus A. Peter, St. Leon-Rot (DE)

(73) Assignee: SAP AG, Walldorf (DE)

( * ) Notice: Subject to any disclaimer, the term of this patent is extended or adjusted under 35 U.S.C. 154(b) by 372 days.

(21) Appl. No.: 11/776,981

(22) Filed: Aug. 3, 2007

(65) Prior Publication Data

US 2009/0037535 A1 Feb. 5, 2009

(51) Int. Cl.
*G06F 15/16* (2006.01)

(52) U.S. Cl. ........................................ 709/201; 709/204

(58) Field of Classification Search .................. 709/206
See application file for complete search history.

(56) References Cited

U.S. PATENT DOCUMENTS

| | | | | | |
|---|---|---|---|---|---|
| 5,590,049 | A * | 12/1996 | Arora | | 716/112 |
| 6,907,401 | B1 * | 6/2005 | Vittal et al. | | 705/26.2 |
| 2002/0138583 | A1 * | 9/2002 | Takayama | | 709/206 |
| 2005/0089129 | A1 * | 4/2005 | O'Brien et al. | | 375/371 |
| 2005/0091584 | A1 * | 4/2005 | Bogdan et al. | | 715/514 |
| 2005/0108332 | A1 * | 5/2005 | Vaschillo et al. | | 709/206 |
| 2006/0036514 | A1 * | 2/2006 | Steelberg et al. | | 705/28 |
| 2006/0253540 | A1 * | 11/2006 | Hughes | | 709/207 |
| 2007/0167178 | A1 * | 7/2007 | Al-Harbi | | 455/466 |
| 2009/0037535 | A1 * | 2/2009 | Stuhec et al. | | 709/206 |

OTHER PUBLICATIONS

'xCBL 4.0 Final Release Now Available' [online]. xCBL, 2000, [retrieved on Jul. 12, 2007]. Retrieved from the Internet: <URL: www.web.archive.org/web/20060619154652/http://www,xcbl.org>, 3 pages.

'A Complete Family of On-Demand SRM Solutions' [online]. Perfect Commerce, 2005, [retrieved on Jul. 12, 2007]. Retrieved from the Internet: <URL: www.web.archive.org/web/20060706034828/www.perfect.com/home/index/html>, 2 pages.

'RosettaNet Standards' [online]. Rosettanet, 1998-2007, [retrieved on Jul. 12, 2007]. Retrieved from the Internet: <URL: www.portal.rosettanet.org/cms/sites/RosettaNet/Standards/RStandards/index.html>, 2 pages.

'APACS—the UK Payments Association' [online]. APACS, 2005, [retrieved on Jul. 12, 2007]. Retrieved from the Internet: <URL: web.archive.org/web/20060711112524/http://www.apacs.org.uk>, 1 page.

'OASIS Universal Business Language (UBL) TC' [online]. Oasis, [retrieved on Jul. 12, 2007]. Retrieved from the Internet: <URL: www.oasis-open.org/committees/tc_home/php?wg_abbrev=ubl>, 7 pages.

'C1DX-open standards that open markets' [online]. CIDX, 2006, [retrieved on Jul. 12, 2007]. Retrieved from the Internet: <URL: www.web.archive.org/web/20060708031302/http://www.cidx.org>, 2 pages.

(Continued)

*Primary Examiner* — Firmin Backer
*Assistant Examiner* — Keyvan Emdadi
(74) *Attorney, Agent, or Firm* — Fish & Richardson P.C.

(57) ABSTRACT

Among other disclosure, a computer-implemented method for creating an electronic communication includes identifying, for an electronic communication regarding multiple items that is to be sent, a default value that applies to at least one of the items. The method includes including the default value in a default component configured for holding multiple default values. The method includes identifying a data structure that is common to more than one of the multiple items. The method includes defining the data structure in a list component configured for holding multiple data structures. The method includes forwarding the electronic communication, including the default component and the list component.

26 Claims, 12 Drawing Sheets

OTHER PUBLICATIONS

'Open Applications Group: Standards for Business Software Interoperability' [online]. OAGi, [retrieved on Jul. 12, 2006]. Retrieved from the Internet: <URL: www.web.archive.org/web/20060616190904/http:openapplications.org>, 3 pages.

'Core Components Technical Specification—Part 8 of the ebXML Framework' [online]. UN/CEFACT, 2003, [retrieved on Jul. 12, 2007]. Retrieved from the Internet: <URL: http://www.unece.org/cefact/ebxml/CCTS_V2-01_Final.pdf>, 113 pages.

* cited by examiner

200

202

<<ABIE>>

Seller_ Party. Details

| Type | OCQ | OCT | PQ | PT | RT | Occ. |
|---|---|---|---|---|---|---|
| <<Container>> | Seller_ | Party. | | Determined. | Default | [0..1] |
| <<BBIE>> | Seller_ | Party. | | Identification | Identifier | [1..1] |
| <<BBIE>> | Seller_ | Party. | | Identification | Name | [0..1] |
| <<BBIE>> | Seller_ | Party. | Purchasing_ | Description. | Text | [0..1] |
| <<BBIE>> | Seller_ | Party. | | Access Rights. | Code | [0..1] |
| <<BBIE>> | Seller_ | Party. | Purchasing_ | Classification. | Code | [0..1] |
| <<BBIE>> | Seller_ | Party. | Selling_ | Role. | Code | [0..1] |
| <<BBIE>> | Seller_ | Party. | | Language. | Code | [0..1] |
| <<ASBIE>> | Seller_ | Party. | | Specified. | Organization | [0..1] |
| <<ASBIE>> | Seller_ | Party. | | Contact. | Person | [0..1] |
| <<ASBIE>> | Seller_ | Party. | | Responsible. | Person | [0..1] |
| <<ASBIE>> | Seller_ | Party. | Purchasing_ | Action. | Event | [0..1] |
| <<ASBIE>> | Seller_ | Party. | | Defined. | Contact | [0..1] |
| <<ASBIE>> | Seller_ | Party. | | Specified. | Address | [0..1] |
| <<ASBIE>> | Seller_ | Party. | | Residence. | Address | [0..1] |

206

204

<<Container>>

Seller_ Party_ Default Details

| | Type | OCQ | OCT | PQ | PT | RT | Occ. |
|---|---|---|---|---|---|---|---|
| 204A | <<BBIE>> | * | * | * | * | Identifier | [0.1] |
| 204B | <<BBIE>> | * | * | | Description. | Text | [0.1] |
| 204C | <<BBIE>> | Seller_ | Party. | | Access Rights. | Code | [0.1] |
| 204D | <<BBIE>> | * | * | | Classification. | Code | [0.1] |
| 204E | <<BBIE>> | * | * | Selling | Role. | Code | [0.1] |
| 204F | <<BBIE>> | * | * | | Language. | Code | [0.1] |

```
</xsd:schema ....>
        ...
        <xsd:complexType name="SellerPartyDetails">
                <xsd:sequence>
                        <xsd:element name="DeterminedDefault" type="ccts:SellerPartyDefaultDetails"/>
                        <xsd:element name="ID" type="cdt:IDType"/>
                        <xsd:element name="OrganizationName" type="cdt:NameType"/>
                        ....
                </xsd:sequence>
        </xsd:complexType>
        <xsd:complexType name="SellerPartyDefaultDetails">                    404
                <xsd:sequence>
                        <xsd:element name="Identifier" type="ccts:IDDefault" minOccurs="0"/>
                        <xsd:element name="Description" type="ccts:DescriptionTextDefault"
                                minOccurs="0"/>
                        <xsd:element name="SellerPartyAccessRightsCode"
                                type="ccts:SellerPartyAccessRightsCodeDefault" default="Public"
402                             minOccurs="0"/>
                        <xsd:element name="ClassificationCode"
                                type="ccts:ClassificationCodeDefault" default="323" minOccurs="0"/>
                        <xsd:element name="SellingRoleCode" type="ccts:SellingRoleCodeDefault"
                                minOccurs="0"/>
                        <xsd:element name="LanguageCode" type="ccts:LanguageCodeDefault"
                                default="EN" minOccurs="0"/>
                </xsd:sequence>
        </xsd:complexType>
        <xsd:complexType name="IDDefault">
                <xsd:simpleContent>
                        <xsd:restriction base="cdt:IDType">
                                <xsd:attribute name="schemeID" default="UUID"/>
                                <xsd:attribute name="schemeAgencyID" default="296"/>        406
                                <xsd:attribute name="schemeVersionID" default="2005"/>
                        </xsd:restriction>
                </xsd:simpleContent>
        </xsd:complexType>
        <xsd:complexType name="DescriptionTextDefault">
                <xsd:simpleContent>
                        <xsd:restriction base="cdt:TextType">
                                <xsd:attribute name="languageCode" default="DE"/>
                        </xsd:restriction>
                </xsd:simpleContent>
        </xsd:complexType>
        ....
</xsd:schema>
```

```
<ccts:PurchaseOrder ...>
    <SellerParty>
        <DeterminedDefault>
            <Identifier schemeID="UUID" schemeAgencyID="1" schemeVersionID="2005"/>
            <Description languageCode="DE"/>
            <SellerPartyAccessRightsCode listID="AccessRightCodeList" listVersionID="1"
listAgencyID="9999">Public</SellerPartyAccessRightsCode>
            <ClassificationCode listID="UNSPSC" listVersionID="3" listAgencyID="161">323</
ClassificationCode>
            <SellingRoleCode listAgencyID="310"/>
            <LanguageCode listID="639-1" listVersionID="2002" listAgencyID="5">EN</LanguageCode>
        </DeterminedDefault>
        <ID>1baa57f9-0a01-0010-1684-c42a08982294</ID>
        <OrganizationName>PencilShop AG</OrganizationName>
        <PurchasingDescription>Dieses Bestelldokument beinhaltet die Bestellung von 200 Bleistiften</
PurchasingDescription>
        <SellingRoleCode listID="SellRolCodList" listVersionID="2">344</SellingRoleCode>
        <SpecifiedOrganization>
            <ID>40b651cb-a662-2910-ac8c-afcd3073126f</ID>
            <LegalClassificationCode listID="LeClaCo" listVersionID="3F7" listAgencyID="777">AXF</
LegalClassificationCode>
            <TaxRegistrationID schemeID="TaxRegIDS" schemeVersionID="7"
schemeAgencyID="666">34543-FFF-A</TaxRegistrationID>
            <Description languageCode="EN">This is the ordered company-</Description>
        </SpecifiedOrganization>
    </SellerParty>
</ccts:PurchaseOrder>
```

```
</xsd:schema ...>
        <xsd:element name="PurchaseOrderRequest" type="ccts:RequestingPurchaseOrder"/>
        <xsd:complexType name="RequestingPurchaseOrder">
                <xsd:sequence>
                        <xsd:element name="ID" type="cdt:IDType"/>
                        ....
                        <xsd:element name="LineItemList" type="ccts:LineItemList" minOccurs="0"/>
                </xsd:sequence>
        </xsd:complexType>
        <xsd:complexType name="DefaultDetails">
                <xsd:sequence>
                        <xsd:element name="Identifier" type="ccts:IDDefault" minOccurs="0"/>
                        <xsd:element name="Description" type="ccts:DescriptionTextDefault"
                                minOccurs="0"/>
                        <xsd:element name="LanguageCode" type="ccts:LanguageCodeDefault"
                                default="EN" minOccurs="0"/>
                </xsd:sequence>
        </xsd:complexType>
        ....
        <xsd:complexType name="LineItemList">
                <xsd:sequence>
                        <xsd:element name="DeterminedDefault" type="ccts:DefaultDetails"
                                minOccurs="0"/>
                        <xsd:element name="OrderedProduct" type="ccts:ProductDetails"
                                minOccurs="0" maxOccurs="unbounded"/>
                </xsd:sequence>
        </xsd:complexType>
        <xsd:complexType name="ProductDetails">
                <xsd:sequence>
                        <xsd:element name="ID" type="cdt:IDType"/>
                        <xsd:element name="NumberID" type="cdt:IDType"/>
                        <xsd:element name="ThirdPartyDealIndicator" type="cdt:IndicatorType"
                                minOccurs="0"/>
                        <xsd:element name="DirectMaterialIndicator" type="cdt:IndicatorType"
                                minOccurs="0"/>
                        <xsd:element name="Description" type="cdt:TextType" minOccurs="0"/>
                        <xsd:element name="RequestedUnitPriceMonetaryAmount" minOccurs="0"/>
                        <xsd:element name="TotalMonetaryAmount" minOccurs="0"/>
                        <xsd:element name="TaxExemptIndicator" type="cdt:IndicatorType"
                                minOccurs="0"/>
                        <xsd:element name="TaxExemptionCode" type="cdt:CodeType"
minOccurs="0"/>
                </xsd:sequence>
        </xsd:complexType>
</xsd:schema>
```

702 (LineItemList complexType) 704 (minOccurs="0")

```
<ccts:PurchaseOrder ...>
    <SellerParty>
        <DeterminedDefault actionCode="01" >
            <Identifier schemeID="UUID" schemeAgencyID="1" schemeVersionID="2005"/>
            <Description languageCode="DE"/>
            <SellerPartyAccessRightsCode listID="AccessRightCodeList" listVersionID="1" listAgencyID="9999">Public</
SellerPartyAccessRightsCode>
            <ClassificationCode listID="UNSPSC" listVersionID="3" listAgencyID="161">323</ClassificationCode>
            <SellingRoleCode listAgencyID="310"/>
            <LanguageCode listID="639-1" listVersionID="2002" listAgencyID="5">EN</LanguageCode>
        </DeterminedDefault>
        <ID>1baa57f9-0a01-0010-1684-c42a08982294</ID>
        <OrganizationName>PencilShop AG</OrganizationName>
        <PurchasingDescription>Dieses Bestelldokument beinhaltet die Bestellung von 200 Bleistiften</PurchasingDescription>
        <SellingRoleCode listID="SellRolCodList" listVersionID="2">344</SellingRoleCode>
        <SpecifiedOrganization actionCode="02">
            <ID>40b651cb-a662-2910-ac8c-afcd3073126f</ID>
            <LegalClassificationCode listID="LeClaCo" listVersionID="3F7" listAgencyID="777">AXF</
LegalClassificationCode>
            <TaxRegistrationID schemeID="TaxRegIDS" schemeVersionID="7" schemeAgencyID="666">34543-FFF-A</
TaxRegistrationID>
            <Description languageCode="EN">This is the ordered company-</Description>
        </SpecifiedOrganization>
    </SellerParty>
    <LineItemList>
        <DeterminedDefault>
            <Identifier schemeID="UUID" schemeAgencyID="1" schemeVersionID="2005">token</Identifier>
            <Description languageCode="a-a">String</Description>
            <LanguageCode listID="token" listVersionID="token" listAgencyID="1">EN</LanguageCode>
        </DeterminedDefault>
        <OrderedProduct>
            <ID>40b651cb-a662-2910-ac8c-afcd3073126a</ID>
            <NumberID>1</NumberID>
            <ThirdPartyDealIndicator>false</ThirdPartyDealIndicator>
            <DirectMaterialIndicator>false</DirectMaterialIndicator>
            <Description>Pencil</Description>
            ...
        </OrderedProduct>
    </LineItemList>
</ccts:PurchaseOrder>
```

802 (brackets LineItemList); 804 (brackets DeterminedDefault); 806 (brackets OrderedProduct)

<CustomerBasicDataChangeRequest>

<Communication> 902
...

904
<TelephoneList CTI="true">
<Telephone> ... </Telephone>
<Telephone> ... </Telephone>
</TelephoneList> 910

906
<MobilePhoneList CTI="true">
<MobilePhone> ... </MobilePhone>
</MobilePhoneList> 912

908
<EmailList CTI="true">
<Email> ... </Email> ...

FIG. 9

CREATING OR INTERPRETING AN ELECTRONIC COMMUNICATION

TECHNICAL FIELD

This document relates to creating or interpreting an electronic communication.

BACKGROUND

United Nations Center for Trade Facilitation and Electronic Business (UN/CEFACT) has approved and distributed a version 2.01 of a document titled "Core Components Technical Specification-Part 8 of the ebXML Framework". The Core Components specification presents a methodology for developing a common set of building blocks, or core components, for standardizing business transactions between business partners and across industries. The core components define the exchanged information in terms of its semantic and structure and represent the general types of business data in use today.

The UN/CEFACT core components are based on class diagrams using the Unified Modeling Language (UML). A basic core component constitutes a singular business characteristic. In contrast, a broader concept consists of several components that can be individually varied and is therefore called an aggregate core component, because it is a collection of related pieces of business information. Association core components represent associations between different core components. Thus, any core component is generally classified as being either a basic, an aggregate or an association core component. In addition, the type of information that a basic core component may contain is defined through a core component type. Core component types have no business semantic (meaning).

While all core components bear specific semantics, none of them carry any notion of the business context in which they are to be used. Rather, for every specific business context the core component takes the form of a piece of business data called a business information entity. Like core components, the business information entities come in the three flavors basic, aggregate and association, which have essentially the same meaning here. Thus, every business information entity is based on a core component and is intended for use in a specific business context. The business information entity contains a narrower definition than the corresponding core component, may have fewer properties, and the allowed values of properties may be restricted. The names of business information entities can be derived by adding a qualifier to the name of the corresponding core component.

The exchange of access-to-archive (A2A) or business-to-business (B2B) messages can depend on the status, progress and behavior of a collaborative business. It can require a party to inform one or more other about actions and commonly to process actions such as creating, deleting or changing business information to be exchanged.

SUMMARY

The invention relates to creating or interpreting an electronic communication.

In a first aspect, a computer-implemented method for creating an electronic communication includes identifying, for an electronic communication regarding multiple items that is to be sent, a default value that applies to at least one of the items. The method includes including the default value in a default component configured for holding multiple default values. The method includes identifying a data structure that is common to more than one of the multiple items. The method includes defining the data structure in a list component configured for holding multiple data structures. The method includes forwarding the electronic communication, including the default component and the list component.

Implementations can include any, all or none of the following features. The default component can include at least two components, a first component listing each element covered by the default component, and at least one second component associated with the first component, the second component containing the default value for the element listed in the first component. The electronic communication can include a hierarchy of data elements, including at least one data element that is defined as an aggregation element of other data elements. The default component can be included in the aggregation element. The default component can be configured so that it is valid only in the aggregation element and in any of the data elements that are below the aggregation element in the hierarchy. The method can further include causing, during instantiation of subelements of the aggregation element, any of the subelements covered by the default value not to be instantiated. The method can further include partially overriding the default value by instantiating at least one of several subelements of the aggregation element. The method can further include partially overriding the default value by including another default component in another data element that is below the aggregation element in the hierarchy. The list component can be configured to define the data structure for any data element of the aggregation element that has a cardinality of [0 . . . n]. The method can further include including the default component within the list component. The data structure can reflect a composition of the more than one of the multiple items. Identifying the data structure can include determining whether the multiple items is a complete list, and the data structure can include an indicator reflecting the determination. The electronic communication can include multiple list components, and the method can further include using an identical indicator in all of the multiple list components.

In a second aspect, a computer program product is tangibly embodied in a computer-readable medium and includes instructions that when executed by a processor perform a method for creating an electronic communication. The method includes identifying, for an electronic communication regarding multiple items that is to be sent, a default value that applies to at least one of the items. The method includes including the default value in a default component configured for holding multiple default values. The method includes identifying a data structure that is common to more than one of the multiple items. The method includes defining the data structure in a list component configured for holding multiple data structures. The method includes forwarding the electronic communication, including the default component and the list component.

In a third aspect, a computer-implemented method for interpreting a received electronic communication includes receiving an electronic communication regarding multiple items. The method includes obtaining a default value from a default component included in the electronic communication. The method includes associating the default value with at least one of the items. The method includes obtaining a data structure from a list component included in the electronic communication. The method includes associating the data structure with at least some of the items. The method includes processing the electronic communication using the default value and the data structure.

Implementations can include any, all or none of the following features. The default value can be assigned to the at least one of the items that does not have an instantiated value. The data structure can reflect a composition of the more than one of the multiple items. The data structure can include an indicator reflecting a determination whether the multiple items is a complete list.

In a fourth aspect, a computer program product is tangibly embodied in a computer-readable medium and includes instructions that when executed by a processor perform a method for interpreting a received electronic communication. The method includes receiving an electronic communication regarding multiple items. The method includes obtaining a default value from a default component included in the electronic communication. The method includes associating the default value to at least one of the items. The method includes obtaining a data structure from a list component included in the electronic communication. The method includes associating the data structure with at least some of the items. The method includes processing the electronic communication using the default value and the data structure.

Implementations can provide any, all or none of the following advantages: providing improved handling of defaults and lists; providing improved use of supplementary components; providing improved electronic communication; providing less redundancy in electronic communication; providing higher performance in electronic communication; providing optimized and smaller message structure in electronic communication; providing improved handling of completeness indication in an electronic communication.

The details of one or more embodiments are set forth in the accompanying drawings and the description below. Other features and advantages will be apparent from the description and drawings, and from the claims.

DESCRIPTION OF DRAWINGS

FIG. 2 is an example of a hierarchy with a default container.

FIG. 4 is an example of a scheme representation.

FIG. 5 is an example of an instance representation.

FIG. 7 is an example of a scheme representation.

FIG. 8 is an example of an instance representation.

FIG. 9 is an example of lists.

Like reference symbols in the various drawings indicate like elements.

DETAILED DESCRIPTION

Figure 1:
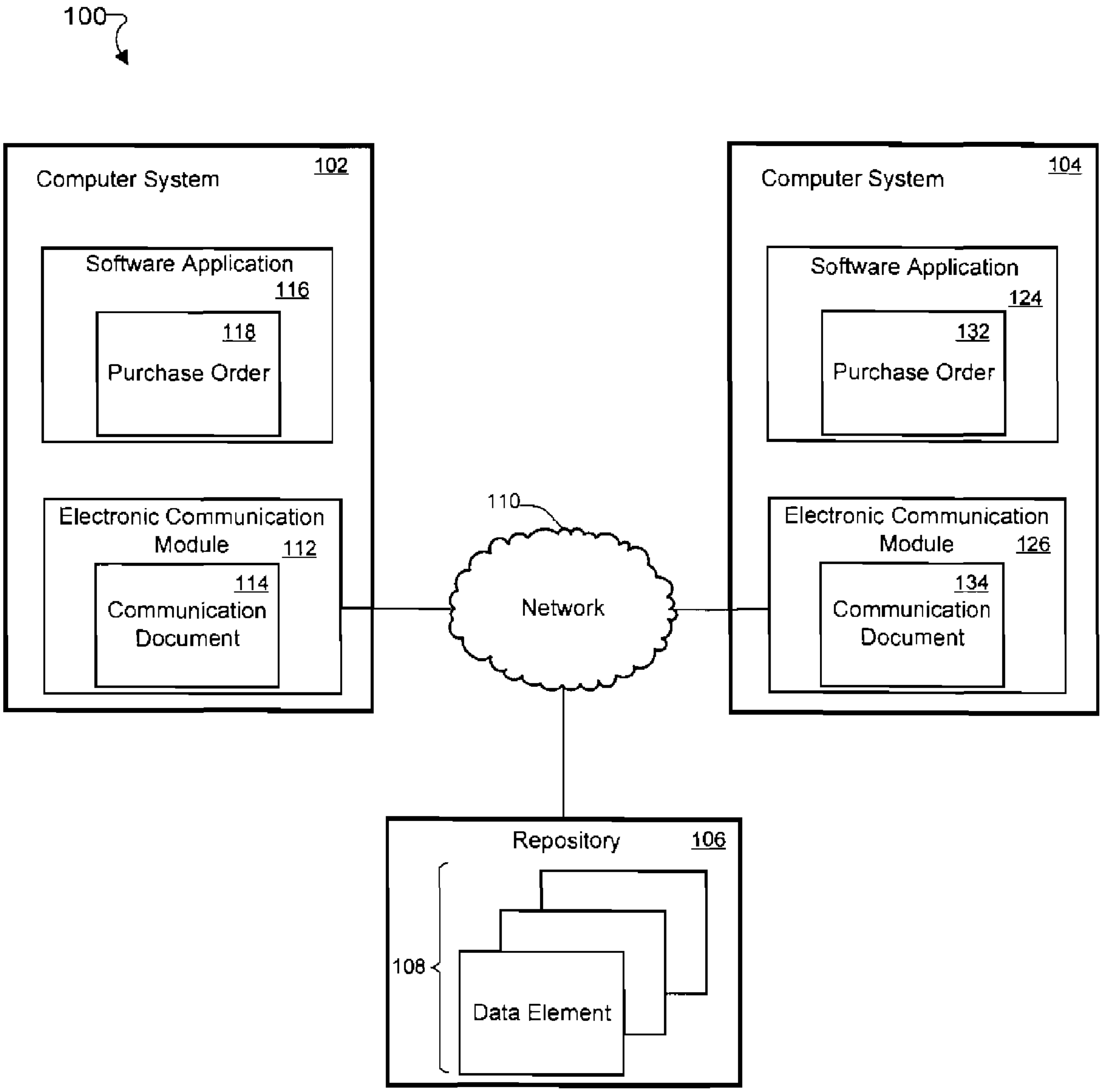
FIG. 1 shows an example of a system that can handles a default and a list.

FIG. 1 shows an exemplary system 100 for storing and manipulating data and for engaging in electronic communication, such as by transmitting and/or receiving one or more business messages. For example, a data element can be included as a component of an electronic communication, such as in a formatted electronic document, to identify a specific information category or information portion therein. In some examples, each of the data elements may be associated with one or more contexts that qualify and refine the data elements according to their use. Using the system 100, for example, the exchange of information can be provided by including a list feature and a default feature in the electronic communication. The description below will give examples of list containers and default containers that can be used for this and/or other purposes.

The system 100 here includes computer systems 102, 104 and a repository 106. For example, each of the computer systems 102, 104 may be operated by one of the parties of an electronic communication. As shown, the repository 106 stores a plurality of data elements 108. The data elements can be part of a schema that the parties operating the systems 102 and 104 agree to use for the electronic communication.

The repository 106 and the computer systems 102, 104 are connected via a network 110 (e.g., the Internet). In one example, the computer systems 102, 104 can access the repository 106 to obtain definitions and properties of the data elements 108 through the network 110. In some examples, the repository 106 can provide one or more list containers and/or one or more default containers to be included in the communication.

The computer system 102 includes an electronic communication module 112 to interface with the network 110. In this example, the electronic communication module 112 includes a communication document 114. In one example, the electronic communication module 112 may transmit the communication document 114 to the computer system 104 through the network 110. In another example, the electronic communication module 112 may receive the communication document 114 from the computer system via the network 110.

The computer system 102 also includes a software application 116 for processing electronic documents for electronic communications. For example, the software application 116 may be a software editor that presents electronic documents. In the depicted example, the software application 116 includes a purchase order 118 for processing. In one example, the software application 116 may include data elements to create the purchase order 118 to be transmitted to the computer system 102. In another example, the software application 116 may identify data elements in the communication document 114 and present the purchase order 118 according to the data elements.

Similarly, the computer system 104 includes a software application 124 and an electronic communication module 126. A user of the computer system 104 can use the software application 124 to edit or review, in this example, a purchase order 132. The user can also use the computer system 104 to transmit or receive a communication document 134 via the network 110. The components having the same name as components in the system 10 may have identical or similar functions to those component. Particularly, the system 104 can process contents of the electronic communication, such as any list features or default values included therein.

FIG. 2 shows an example of how the electronic communication can include a hierarchy 200 of data elements and how a default component can advantageously be used for one or more values in the hierarchy, such as to eliminate redundancy at runtime. The hierarchy 200 can include many elements, but only two are explicitly shown for clarity. Particularly, the hierarchy is here shown to include an ABIE 202 and a default container 204.

The ABIE 202 relates to details of the seller party. For example, in a sales transaction that is to be documented through an electronic communication, the ABIE 202 can be used to structure the data relating to the selling party. The ABIE 202 here is an aggregation data element and therefore includes a number of other containers as its properties. First of the listed properties in the default container 204. Thereafter is listed data elements that relate to various aspects of the seller party, such as the seller party's address in data element 206. This data element is an ASBIE, meaning that the ABIE 202 has an association with another data element (such as another ABIE, not explicitly shown). Other data elements listed in the properties of the ABIE 202 can relate to other aspects of the seller party.

Here, the default container 204 is configured so that it is valid in the ABIE 202 element and not in any data element that is higher in the hierarchy 200 than the ABIE 202. As another example, the default container may also not be valid in any data element that belongs to another branch of the hierarchy 200 than the ABIE 202. However, the default container 204 can be configured to be valid in any of the data elements that are below the aggregation element in the hierarchy. For example, the default container 204 can be valid in any or all of the BBIEs and the ASBIEs listed in the ABIE 202. This can have the advantage that a default value listed using the default container 204 can be used in a lower-level data element without explicitly stating (or instantiating, to name another example) the default value in that lower-level data element.

Here, a first row in the default container 204 is a BBIE 204A for any identifier covered by the default. The BBIE 204A applies to any identifier in the scope of the default (e.g., within the ABIE 202 and its subhierarchies) because it contains a wildcard character (*) for all defining terms except a representations term, which is "identifier". Also, its occurrence is listed as [0 . . . 1], meaning that one or no identifiers may be give a default value using the default container 204. Similarly, other BBIEs 204B-F are seen to apply to other kinds of information like text and code. For example, the BBIE 204C is specifically defined to apply only to the code for access rights applying to the seller party. That is, any default value(s) specified using the BBIE 204C will be valid only for that access-rights code.

Thus, when generating an electronic communication using the default container 204, any subelements covered by the default value need not be instantiated. For example, those elements can be ignored in a process of instantiating the relevant elements. Similarly, when interpreting the electronic communication using the default container 204, items matching a definition in the default container can be assigned with the default value, with an important exception that will be described in the following example.

It can be provided to partially or fully override a defined default value. For example, the default value can be partially overridden by instantiating at least one of several subelements of the aggregation element. That is, in the ABIE 202 that is here used, one or more of the included BBIEs whose included elements fits a defined default can nevertheless be instantiated to have a specific value. In some implementations, the processing of defaults is configured to detect this instantiation and, in response, not apply the default value(s) to such an instantiated element.

As another example, partially overriding the default value can be done by including another default component in another data element that is below the aggregation element in the hierarchy. That is, another default container similar to the container 204 can be included in one of the BBIEs of the ABIE 202, or in another ABIE that is connected via an ASBIE, to name two examples.

Figure 3:
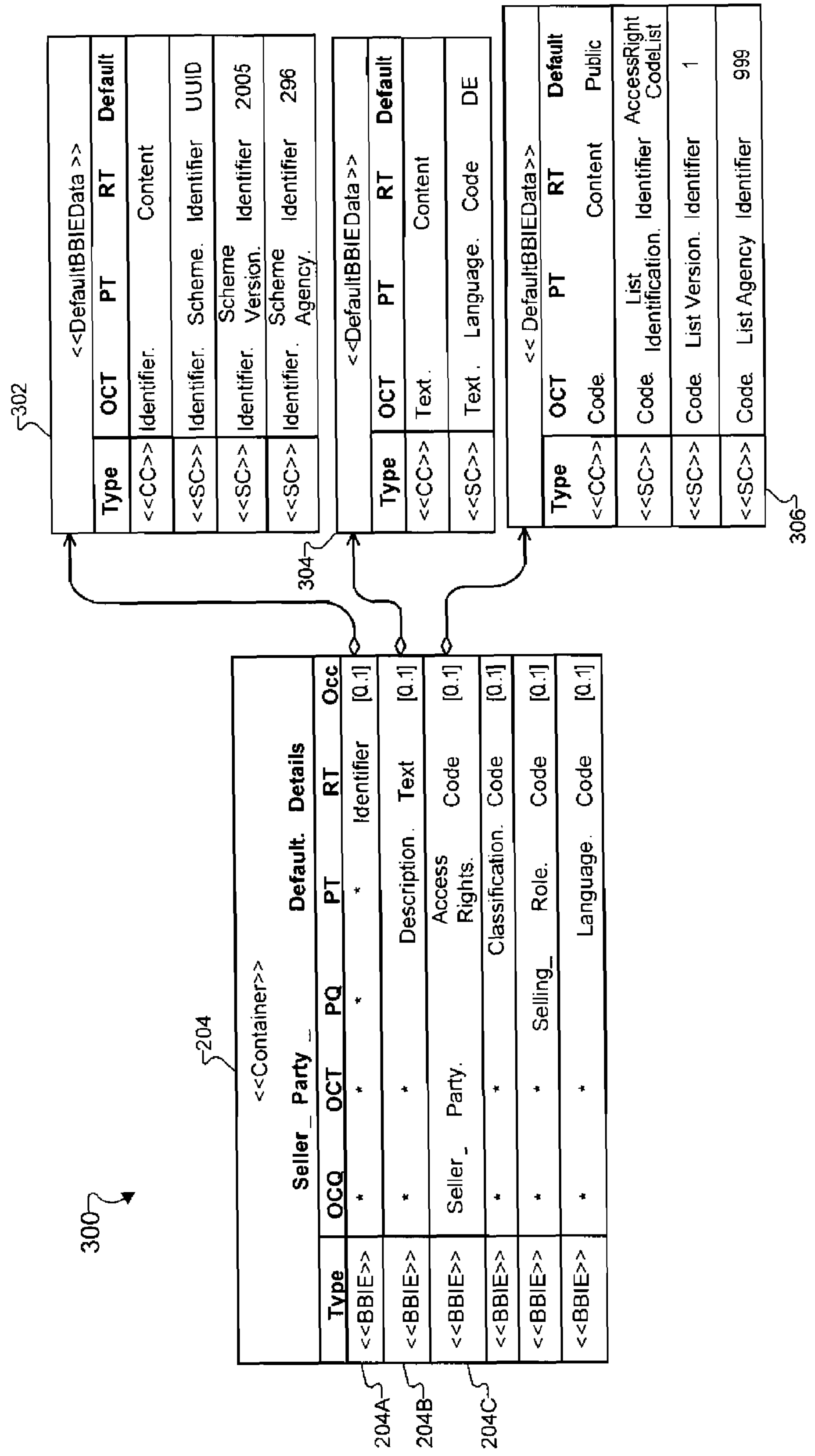
FIG. 3 is an example of a default container.

FIG. 3 shows an example of components 300 that can be included in a default container. For clarity, the components 300 involve the default container 204 mentioned above, but any other default component can be used. Accordingly, the default container 204 can be a first component listing each element covered by a default component.

Here, the default container 204 is associated with value containers 302, 304 and 306. Each of the containers 302-306 here relates to a corresponding row in the default container 204. For example, the components 300 can reflect the situation when actual default values are determined for any or all of the rows in the default container. That is, default values have here been determined for the BBIEs 204A-C. Accordingly, the one or more containers 302-306 can contain at least one determined default value.

The containers 302-306 can contain the determined default values in form of supplementary components. For example, the first container 302 here contains the determined default values "UUID", "2005" and "296". In short, these default values can relate to an identification scheme used to generate one or more identifiers. For example, the International Standard Book Number (ISBN) is one identification scheme that can be used for books. Moreover, a scheme entity can be implemented that represents the ISBN scheme, and the values in the container 302 can relate to such a scheme entity. Particularly, UUID is short for Universal Unique Identifier which is a 128-bit number used to uniquely identify an object or entity on the Internet. As such, the determined default value can identify UUID as the identification scheme to be used for all BBIEs covered by the default. The other default values in the container 302 indicate that a 2005 version of UUID is to be used, and that the agency responsible for the uniqueness of UUID identifiers is associated with a code 296.

Similarly, the container 304 indicates that German is the default language to be used for all BBIEs covered by the default. That is, the code "DE" has been identified as the default value for the language of the text relating to this ABIE.

Finally, the container 306 indicates the determined default values "Public", "AccessRightCodeList", "1" and "999" for the access rights of the seller party, according to the ABIE 204C.

Other types of defaults and/or other specific values can be used in other implementations. Also, the values can be arranged differently than in the shown implementation.

FIG. 4 shows an example of code 400 that can be used as an implementation of a default component, for example the default container 204 (FIGS. 2-3). That is, the code 400 can correspond to a schema representation of the ABIE 202 and it can include code 402 that corresponds to the default container 204. For example, code 404 specifies that any identifier covered by the default is of the type "IDDefault". Similarly, the ABIE 204C (FIGS. 2-3) is being assigned the default value "Public". Each of these default values defined already at the schema level can be considered a "default of a default"; that is, they are values that apply in lieu of a later default determination (e.g., to find values for other default aspects). Code 406 indicates that supplementary components, here relating to an identification scheme, can have default values defined in the scheme implemented using the code 400. That is, in this example the values "UUID", "296" and "2005" are defined for the supplementary components. Other values or arrangements of the code can be used.

FIG. 5 shows code 500 that is an example of a representation of an instance, in this example, an XML instance of a purchase order. Code 502 corresponds to the default component, for example to the default container 204. (FIGS. 2-3). Similar to the description above, the code 502 includes the attributes that have determined to be the default values for the relevant data elements. Here, a code 504 represents an identifier based on UUID, which is the default identification scheme according to the code 502.

Code 506 corresponds to an organization specified as relating to the relevant purchase order. The code 506 here contains code 508 with an identifier "666" for the scheme agency. This is to be contrasted with the identifier "1" defined as the default scheme agency according to the code 502. Accordingly, the code 508 is an example of overriding the default component by specifically instantiating a specific value for a data element covered by the default component. It is noted that the purchase order in this example contains only a single specified organization and that in other examples or implementations it could contain several, such as hundreds of specified organizations.

Figure 6:
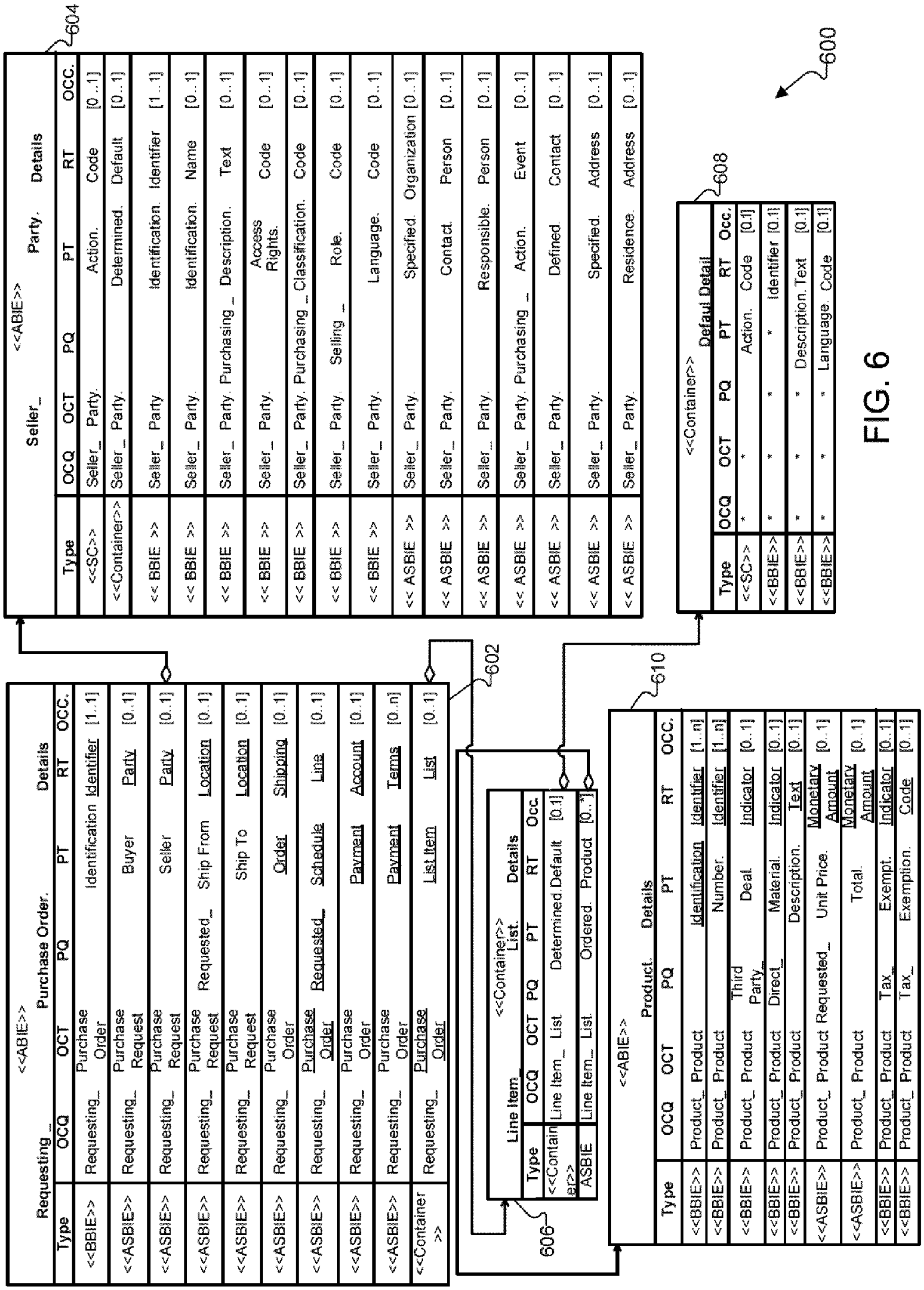
FIG. 6 is an example of a hierarchy with a list container.

FIG. 6 shows an example of how the electronic communication can include a hierarchy 600 of data elements and how a list container can advantageously be used for one or more list values in the hierarchy. For clarity, the hierarchy 600 is here shown to include a few components, and could include more or fewer in another example.

Particularly, the hierarchy here includes an ABIE 602 that relates to details of a request for a purchase order. The ABIE 602 is associated with an ABIE 604 that relates to details of the selling party. As such, the ABIE 604 can be considered analogous to the ABIE 202 mentioned above, but it is noted that the ABIE 604 in this example is not explicitly shown as having any default container. In other implementations, however, the ABIE 604 can contain a default container.

The ABIE 602 further includes a list container 606. The list container 606 is configured for holding multiple data structures. In this example, it contains a default container 608 and an ABIE 610. Here, the ABIE 610 can be repeated multiple times, or even indefinitely. For example, the list container 606 can be included in the ABIE 602 to provide clear hierarchical separation of an ABIE that can be repeated indefinitely. That is, the list container can be used to avoid repeated inclusion of data structures or other information that could occur multiple or even numerous times. An example is a purchase order that covers orders of 20,000 products. Rather than repeating some or all information regarding a product every time it occurs (i.e., up to 20,000 times in this example), the list container 606 can provide that the information need only be listed once. As another example, the list container can be a useful concept in managing incomplete transmissions (see, e.g., FIG. 9 below).

The ABIE 610 is included in the list container 606 to provide that the purchase order being electronically represented can include any number of product listings without unnecessarily repeating information. The ABIE 610, in turn, can contain one or more other components for use in defining aspects of a product (in this example). For example, the ABIE 610 can directly include one or more BBIEs, such as a material indicator. As another example, the ABIE 610 can have associations to one or other data elements through an ASBIE, such as for a monetary amount regarding a requested unit price. Accordingly, the data structure specified by the ABIE 610 can reflect a composition of the items in the list (in this example, the products).

It can happen, however, that the particular request for purchase order does not list any individual products. For example, this can be the case when the purchase order relates only to services (and there may be a separate and analogous list container for services or for any other such data element). In any event, the option of including a product can be indicated by providing the product data element with a cardinality of [0 . . . n], specifying that the number of products covered by the purchase order (in this example) it at least zero and at most n, which can be an arbitrary number. As such, the list component can be configured to define a data structure for any data element of the aggregation element that has a cardinality of [0 . . . n].

The default component 608 can in some implementations play a role similar to that of the default container 204 described above. For example, the default container 608 can contain the determined defaults for any data element affected by the default. Thus, a default component can be included within the list component. For example, any value determined by the default component can be valid in the list container 606 and in any subhierarchy thereof, such as in the ABIE 610.

FIG. 7 shows an example of code 700 that can be included in a representation, such as in an XML representation of a purchase order request. The code 700 includes code 702 that in this example corresponds to the list container 606 (FIG. 6). Moreover, a code 704 corresponds to the occurrence of the list container in the ABIE 602 (FIG. 6). Accordingly, the code 700 can be used as a schema representation of a purchase order.

FIG. 8 is an example of code 800 that can be used to represent an instance of a purchase order, for example in an XML representation for an electronic communication. The code 800 here includes code 802 that in this example corresponds to the list container 606. Code 804 corresponds to the default container 608. Moreover, code 806 here corresponds to a listed item, an ordered product in this example. In other examples, the purchase order can include multiple or even numerous products.

FIG. 9 shows an example of code 900 that illustrates processing of complete or incomplete information. That is, two parties, say the operators of the systems 102 and 104 (FIG. 1), may previously have had a communication regarding some items. For example, the system 102 could have provided a list of telephone numbers to the system 104. It sometimes becomes necessary for them to have a subsequent communication regarding any or all of the listed items, here telephone number. For example, assume that the system 102 needs to correct errors in the previously sent list. Here, there were over-inclusion errors; that is, one or more telephone numbers were included that should not have been listed. There may also have been numerical errors; that is, one or more of the listed telephone numbers may have had errors in them. In other words, system 102 is about to send a corrected list of telephone numbers to the system 104.

Such a transmission will not mention the numbers that were included in error; they are simply omitted before transmission. To ensure that the system 104 understands the omission to be deliberate, the system 102 can include a complete transmission indicator (CTI) 902 in the communication. Because the code 900 in this example conforms with a common schema used by the systems 102 and 104, the CTI 902 will be interpreted to indicate whether the included information is a complete listing of the relevant information. This is in contrast to, say, an incomplete listing that only lists those items (here telephone numbers) that have changes in them but that does not list the items for which there is no change. This interpretation is important because if the receiving system assumes the list to be complete, it will delete from its own records any item(s) not explicitly mentioned in the most recent communication. In contrast, if the listing is assumed to be incomplete, the receiving system can update its records for any item currently included in the list, but might not make any changes in the item(s) not explicitly mentioned.

In this example, then, the code 900 represents a change request for basic data about customers. The code includes at least a telephone list 904, a mobile telephone list (e.g., a list of numbers for cellular telephones), and an email list 908. Here, the lists in the code 900 are based on the container concept described above with reference to the example in FIG. 6. Other lists can be included but are omitted here for clarity.

The telephone list 904 here includes the CTI 902. Moreover, the CTI 902 in this example has the value "true". This means that the list 904 is to be interpreted as a complete list. Accordingly, the receiver of the electronic communication that contains the code 900 can update its corresponding telephone list record to exactly reflect the contents of the list 904. Similarly, the mobile telephone list 906 can include a CTI 910 and the email list 908 can include a CTI 912, respectively. This means that the lists 906 and 908 will be interpreted according to the values of there respective CTIs, which in this example are both "true".

A list component in the communication can also simplify the use of CTIs. For example, note that the CTIs 902, 910 and 912 apply to different lists yet have the same appearance: they are all called simply CTI. That is, there may be no need to give, say, the CTI 902 a name like "telephoneListCTI" to distinguish it from either or both of the other CTIs. Accordingly, an identical indicator can be used in all of multiple list components.

Figure 10:
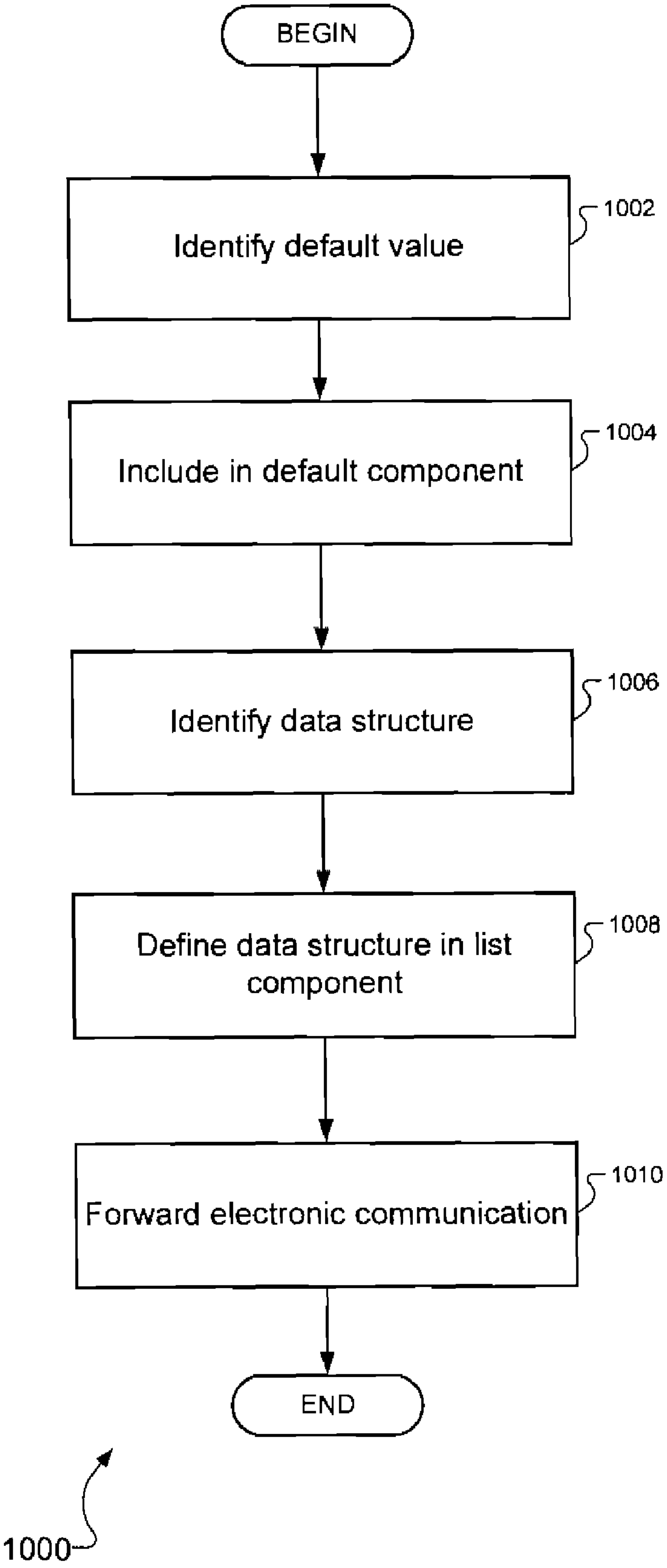
FIGS. 10 and 11 are flowcharts of examples of methods relating to defaults and lists.
Figure 11:
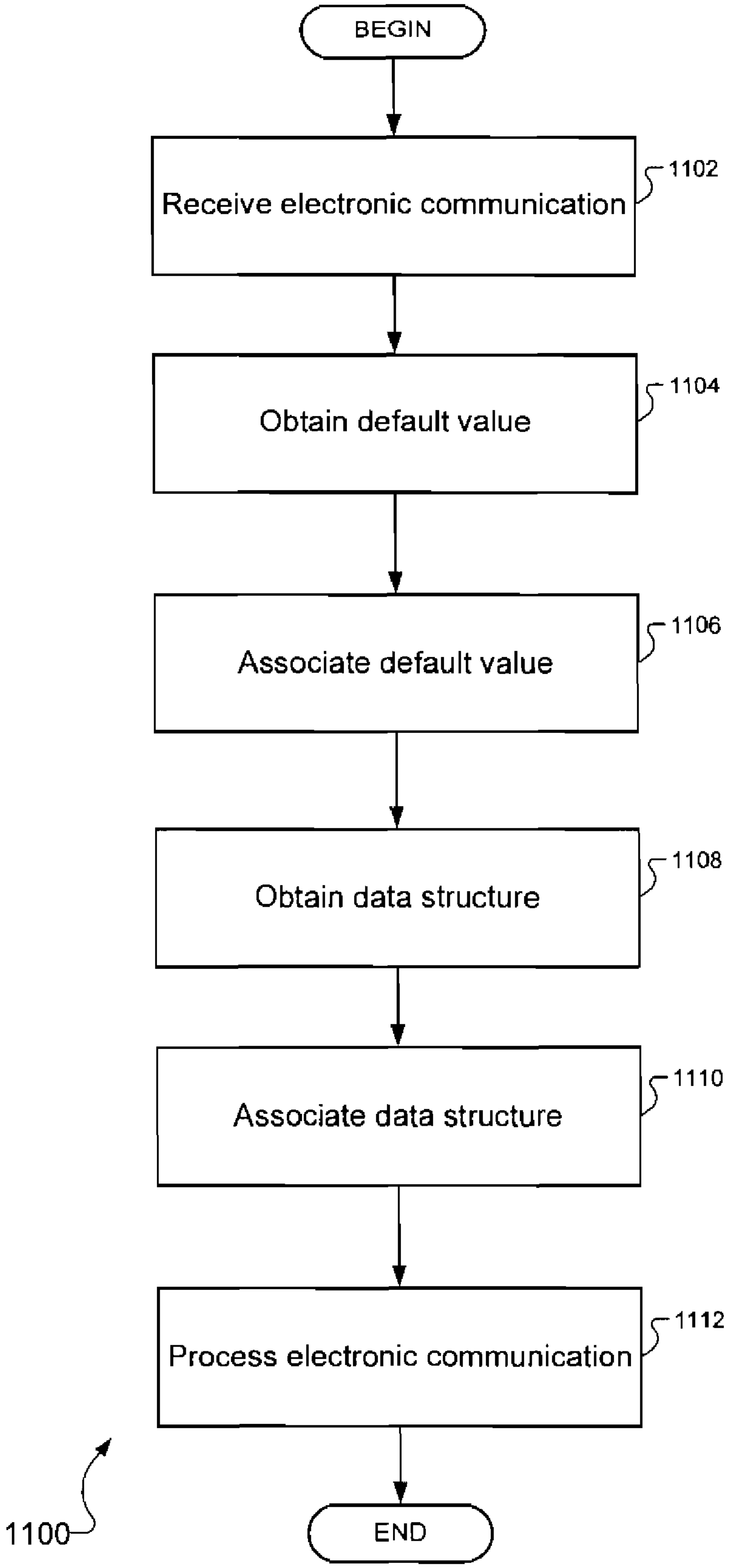

FIGS. 10 and 11 are flowcharts of exemplary methods 1000 and 1100, respectively, that relate to listing and defaulting. Either or both of the methods can be performed by a processor executing instructions in a computer-readable medium, for example in any of the systems 102 or 104 (FIG. 1).

Method 1000 can be performed for creating an electronic communication. Method 1000 includes a step 1002 of identifying a default value that applies to at least one of multiple items. The default value is identified for an electronic communication regarding the multiple items that is to be sent. For example, the system 102 (FIG. 1) can determine a default value such as "UUID" or "999" (FIG. 3) regarding products that are part of a communication such as a purchase order or an invoice.

Method 1000 includes a step 1004 of including the default value in a default component configured for holding multiple default values. For example, the system 102 can include the determined default value(s) in any of the containers 302-306 that are part of the default container 204 (FIG. 3).

Method 1000 includes a step 1006 of identifying a data structure that is common to more than one of the multiple items. For example, the products that can be listed in the hierarchy 600 (FIG. 6) may have a common data structure. As another example, the telephone number items in the list 904 (FIG. 9) may be identified as having a common structure.

Method 1000 includes a step 1008 of defining the data structure in a list component configured for holding multiple data structures. For example, the ABIE 610 (FIG. 6) can be included in the list container 606 to define the structure of any product(s) listed in the request for purchase order. As another example, any or all of the CTIs 902, 910 and 912 (FIG. 9) can be included in the code 900 to define whether the data in their respective lists is a complete transmission. Other ways of defining the data structure can be used.

Method 1000 includes a step 1010 of forwarding the electronic communication, including the default component and the list component. For example, system 102 can forward the code 500 (FIG. 5) or the code 800 (FIG. 8), or a combination thereof, to the system 104.

One or more other steps can be performed in connection with the method 800. As another example, one or more of the steps can be performed in a different order.

Turning now to FIG. 11, method 1100 can be performed for interpreting a received electronic communication. Method 1100 includes a step 1102 of receiving an electronic communication regarding multiple items. For example, the system 104 can receive the code 500 (FIG. 5) or the code 800 (FIG. 8) or a combination thereof.

Method 1100 includes a step 1104 of obtaining a default value from a default component included in the electronic communication. For example, the system 104 can obtain a default value such as "UUID" or "999" from the communication.

Method 1100 includes a step 1106 of associating the default value with at least one of the items. For example, the system 104 can associate the value UUID with an element for an identification scheme, or the value 999 with an agency for issuing an identification scheme.

Method 1100 includes a step 1108 of obtaining a data structure from a list component included in the electronic communication. For example, the system 104 can obtain the structure of a product, or obtain a CTI indicating the completeness/incompleteness of a listing from the list component 606 (FIG. 6).

Method 1100 includes a step 1110 of associating the data structure with at least some of the items. For example, the system can apply the data structure to any product listed in a purchase order, or can interpret the listing as complete or incomplete using the CTI.

Method 1100 includes a step 1112 of processing the electronic communication using the default value and the data structure. For example, the system 104 can process the purchase order by recording the products covered by it. As another example, the system 104 can update its telephone records to exactly reflect the complete list 904 (FIG. 9).

One or more other steps can be performed in connection with the method 800. As another example, one or more of the steps can be performed in a different order.

Figure 12:
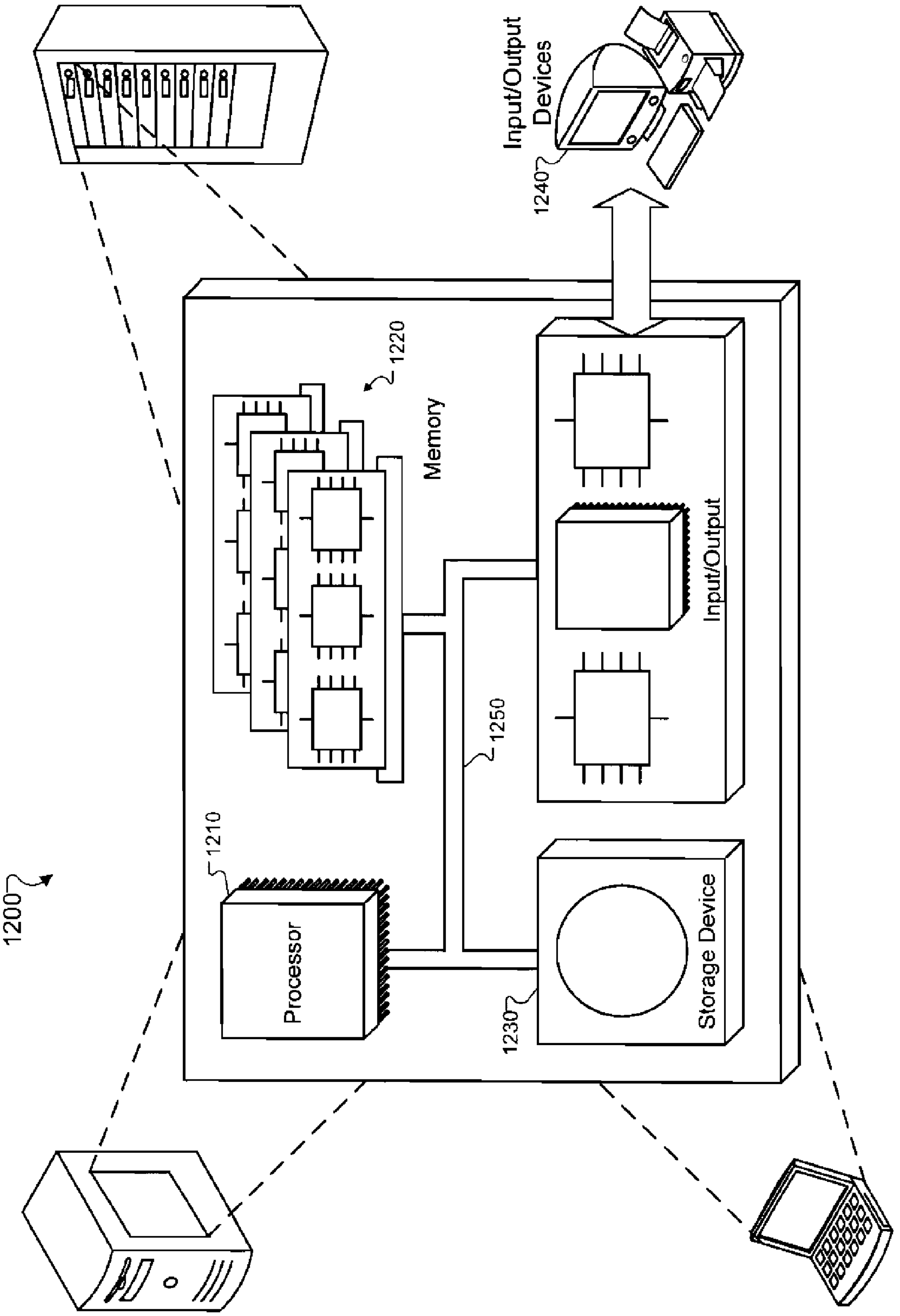
FIG. 12 is a block diagram of a computing system that can be used in connection with computer-implemented methods described in this document.

FIG. 12 is a schematic diagram of a generic computer system 1200. The system 1200 can be used for the operations described in association with any of the computer-implement methods described previously, according to one implementation. The system 1200 includes a processor 1210, a memory 1220, a storage device 1230, and an input/output device 1240. Each of the components 1210, 1220, 1230, and 1240 are interconnected using a system bus 1250. The processor 1210 is capable of processing instructions for execution within the system 1200. In one implementation, the processor 1210 is a single-threaded processor. In another implementation, the processor 1210 is a multi-threaded processor. The processor 1210 is capable of processing instructions stored in the memory 1220 or on the storage device 1230 to display graphical information for a user interface on the input/output device 1240. The system may be implemented, for example, on an individual computer 1200 or on a parallel cluster of computer systems 1200 distributed over a network.

The memory 1220 stores information within the system 12100. In one implementation, the memory 1220 is a computer-readable medium. In one implementation, the memory 1220 is a volatile memory unit. In another implementation, the memory 1220 is a non-volatile memory unit.

The storage device 1230 is capable of providing mass storage for the system 1100. In one implementation, the storage device 1230 is a computer-readable medium. In various different implementations, the storage device 1230 may be a floppy disk device, a hard disk device, an optical disk device, or a tape device.

The input/output device 1240 provides input/output operations for the system 1200. In one implementation, the input/output device 1240 includes a keyboard and/or pointing device. In another implementation, the input/output device 1240 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications may be made without departing from the spirit and scope of this disclosure. Accordingly, other embodiments are within the scope of the following claims.

What is claimed is:

1. A computer-implemented method for creating an electronic communication, the method comprising:

identifying, for multiple items that are each associated with a plurality of data elements, a default data element that includes a default value, the default value being common to at least two of the items, each of the plurality of data elements configured for identifying semantics of an associated data value;

generating an electronic communication that identifies properties of the multiple items, the electronic communication including:

a list component, the list component comprising (i) a list component opening marker and (ii) a list component closing marker, a default component, the default component included between the list component opening and closing markers, the default component comprising (i) a default component opening marker, (ii) a default component closing marker, and (iii) the default data element including the default value that was identified as being common to at least two items, and for each of the multiple items, an item component, the item component included between the list component opening and closing markers, the item component comprising (i) an item component opening marker, (ii) an item component closing marker, and (iii) data elements including values from the plurality of data elements for the item, wherein the default component is not included between the item component opening and closing markers for any of the item components, wherein, from the item components included in the electronic communication, item components for the at least two items that are associated with the default value do not include the default data element, wherein, from the item components included in the electronic communication, item components for items that are not associated with the default value include a data element that is the same as the default data element but includes a value that is different than the default value; and forwarding the electronic communication from a first computing device to a second computing device over a network.

2. The computer-implemented method of claim 1, wherein the electronic communication comprises a hierarchy of data elements, including at least one data element that is defined as an aggregation element of other data elements.

3. The computer-implemented method of claim 2, wherein the default component is included in the aggregation element.

4. The computer-implemented method of claim 3, wherein the default component is configured so that it is valid only in the aggregation element and in any of the data elements that are below the aggregation element in the hierarchy.

5. The computer-implemented method of claim 3, further comprising causing, during instantiation of subelements of the aggregation element, any of the subelements covered by the default value not to be instantiated.

6. The computer-implemented method of claim 3, further comprising partially overriding the default value by instantiating at least one of several subelements of the aggregation element.

7. The computer-implemented method of claim 3, further comprising partially overriding the default value by including another default component in another data element that is below the aggregation element in the hierarchy.

8. The computer-implemented method of claim 2, wherein the list component is configured to define the data structure for any data element of the aggregation element that has a cardinality of [0 . . . n].

9. The computer-implemented method of claim 1, wherein each of the multiple items are associated with a same set of the plurality of data elements.

10. The computer-implemented method of claim 9, wherein the default component includes a second default data element that includes a second default data value.

11. The computer-implemented method of claim 10, wherein the default value of the default data element in the default component does not apply to items associated with item components that include a data element that is the same as the default data element.

12. A computer program product tangibly embodied in a computer-readable device and comprising instructions that when executed by a processor perform a method for creating an electronic communication, the method comprising:

identifying, for multiple items that are each associated with a plurality of data elements, a default data element that includes a default value, the default value being common to at least two of the items, each of the plurality of data elements configured for identifying semantics of an associated data value;

generating an electronic communication that identifies properties of the multiple items, the electronic communication including:

a list component, the list component comprising (i) a list component opening marker and (ii) a list component closing marker, a default component, the default component included between the list component opening and closing markers, the default component comprising (i) a default component opening marker, (ii) a default component closing marker, and (iii) the default data element including the default value that was identified as being common to at least two items, and for each of the multiple items, an item component, the item component included between the list component opening and closing markers, the item component comprising (i) an item component opening marker, (ii) an item component closing marker, and (iii) data elements including values from the plurality of data elements for the item, wherein the default component is not included between the item component opening and closing markers for any of the item components, wherein, from the item components included in the electronic communication, item components for the at least two items that are associated with the default value do not include the default data element, wherein, from the item components included in the electronic communication, item components for items that are not associated with the default value include a data element that is the same as the default data element but includes a value that is different than the default value; and forwarding the electronic communication from a first computing device to a second computing device over a network.

13. The computer program product of claim 12, wherein each of the multiple items are associated with a same set of the plurality of data elements.

14. The computer program product of claim 13, wherein the default component includes a second default data element that includes a second default data value.

15. The computer program product of claim 13, wherein the default value of the default data element in the default component does not apply to items associated with item components that include a data element that is the same as the default data element.

16. A computer-implemented method for interpreting a received electronic communication, the method comprising:

receiving at a first computing device and over a network from a second computing device an electronic communication that identifies the properties of multiple items, the electronic communication including:

a list component, the list component comprising (i) a list component opening marker and (ii) a list component closing marker, a default component, the default component included between the list component opening and closing markers, the default component including (i) a default component opening marker and (ii) a default component closing marker, the default component including between the default component opening and closing markers a default data element that includes a default value, and a plurality of item components, each item component included between the list component opening and closing markers, each item component corresponding to an item of the multiple items, each item component including (i) an item component opening marker and (ii) an item component closing marker, wherein the default component is not included between the item component opening and closing markers for any of the item components; and processing the received electronic communication by:

for each of the plurality of item components between the list component opening and closing markers that does not include the default data element, assigning the default value that is included in the received electronic communication as a property of the item that corresponds to the item component, and for each of the plurality of item components between the list component opening and closing markers that does include a data element that is the same as the default data element, not assigning the default value that is included in the received electronic communication as a property of the item that corresponds to the item component.

17. The computer-implemented method of claim 16, wherein the data structure comprises an indicator reflecting a determination whether the multiple items is a complete list.

18. The computer-implemented method of claim 16, wherein each item component is associated with at least one data element that includes a data value, the data elements of the item components and of the default component each configured for identifying semantics of an included data value.

19. The computer-implemented method of claim 18, wherein the default component includes a second default data element that includes a second default data value, further comprising for each item component between the list component opening and closing markers that does not include the default data element, assigning the second default value as a property of the item that corresponds to the item component.

20. The computer-implemented method of claim 16, further comprising for item components not between the list component opening and closing markers, not assigning the default value as a property of the corresponding items.

21. The computer-implemented method of claim 16, wherein the electronic communication further includes:

a second list component that is included between the list component opening and closing markers, the second list component including a second list component opening marker and a second list component closing marker, a second default component that is included between the second list component opening and closing markers, the second default component including a second default component opening marker and a second default component closing marker, the second default component including between the opening and closing markers a second default data element that includes a second default value, and a second plurality of item components, each second item component included between the second list component opening and closing markers, each second item component associated with an item of the multiple items, each second item component including a second item component opening marker and a second item component closing marker; and further comprising for each of the plurality of second item components between the second list component opening and closing markers that does not include the second default data element, assigning the second default value that is included in the received electronic communication as a property of the item that corresponds to the item component; and further comprising for each of the plurality of second item components between the second list component opening and closing markers that does include a data element that is the same as the second default data element, not assigning the second default value that is included in the received electronic communication as a property of the item that corresponds to the item component.

22. A computer program product tangibly embodied in a computer-readable medium and comprising instructions that when executed by a processor perform a method for interpreting a received electronic communication, the method comprising:

receiving at a first computing device and over a network from a second computing device an electronic communication that identifies the properties of multiple items, the electronic communication including:

a list component, the list component comprising (i) a list component opening marker and (ii) a list component closing marker, a default component, the default component included between the list component opening and closing markers, the default component including (i) a default component opening marker and (ii) a default component closing marker, the default component including between the default component opening and closing markers a default data element that includes a default value, and a plurality of item components, each item component included between the list component opening and closing markers, each item component corresponding to an item of the multiple items, each item component including (i) an item component opening marker and (ii) an item component closing marker, wherein the default component is not included between the item component opening and closing markers for any of the item components; and processing the received electronic communication by:

for each of the plurality of item components between the list component opening and closing markers that does not include the default data element, assigning the default value that is included in the received electronic communication as a property of the item that corresponds to the item component, and for each of the plurality of item components between the list component opening and closing markers that does include a data element that is the same as the default data element, not assigning the default value that is included in the received electronic communication as a property of the item that corresponds to the item component.

23. The computer program product of claim 22, wherein each item component is associated with at least one data element that includes a data value, the data elements of the item components and of the default component each configured for identifying semantics of an included data value.

24. The computer program product of claim 23, wherein the default component includes a second default data element that includes a second default data value, wherein the method further comprises for each item component between the list component opening and closing markers that does not include the default data element, assigning the second default value as a property of the item that corresponds to the item component.

25. The computer program product of claim 22, wherein the method further comprises for item components not between the list component opening and closing markers, not assigning the default value as a property of the corresponding items.

26. The computer program product of claim 22, wherein the electronic communication further includes:

a second list component that is included between the list component opening and closing markers, the second list component including a second list component opening marker and a second list component closing marker, a second default component that is included between the second list component opening and closing markers, the second default component including a second default component opening marker and a second default component closing marker, the second default component including between the opening and closing markers a second default data element that includes a second default value, and a second plurality of item components, each second item component included between the second list component opening and closing markers, each second item component associated with an item of the multiple items, each second item component including a second item component opening marker and a second item component closing marker; and wherein the method further comprises for each of the plurality of second item components between the second list component opening and closing markers that does not include the second default data element, assigning the second default value that is included in the received electronic communication as a property of the item that corresponds to the item component; and wherein the method further comprises for each of the plurality of second item components between the second list component opening and closing markers that does include a data element that is the same as the second default data element, not assigning the second default value that is included in the received electronic communication as a property of the item that corresponds to the item component.

* * * * *